United States Patent [19]

Ohkubo

[11] Patent Number: 4,924,978
[45] Date of Patent: May 15, 1990

[54] LOCK-UP DEVICE FOR TORQUE CONVERTER

[75] Inventor: Masahiro Ohkubo, Kadoma, Japan

[73] Assignee: Kabushiki Kaisha Daiken Seisakusho, Neyagawa, Japan

[21] Appl. No.: 179,324

[22] Filed: Apr. 8, 1988

[30] Foreign Application Priority Data

Apr. 13, 1987 [JP] Japan ................................. 62-90416
Apr. 13, 1987 [JP] Japan ................................. 62-90417

[51] Int. Cl.$^5$ ............................................ F16H 45/02
[52] U.S. Cl. .............................. 192/3.3; 192/85 AA; 192/106 F; 192/109 F
[58] Field of Search ................ 192/3.21, 3.28, 3.29, 192/3.3, 3.33, 106 F, 109 F, 85 A, 85 AA, 86

[56] References Cited

U.S. PATENT DOCUMENTS

| | | | |
|---|---|---|---|
| 2,694,948 | 11/1954 | McFarland | 152/3.3 X |
| 2,726,557 | 12/1955 | Ackerman | 192/3.3 X |
| 2,792,716 | 5/1957 | Christenson | 192/85 AA X |
| 3,001,415 | 9/1961 | Smirl | 192/3.33 X |
| 3,068,974 | 12/1962 | Jandosek | 192/106 F X |
| 3,213,983 | 10/1965 | Smirl et al. | 192/3.3 |
| 3,273,415 | 9/1966 | Frost | 192/85 AA |
| 4,033,436 | 7/1977 | Hoetger et al. | 192/3.3 |
| 4,044,556 | 8/1977 | Kuramochi et al. | 192/3.28 X |
| 4,108,289 | 8/1978 | Arai et al. | 192/3.3 |
| 4,529,070 | 7/1985 | Kobayashi | 192/3.3 X |
| 4,713,984 | 12/1987 | Ohkubo | 192/85 AA X |

FOREIGN PATENT DOCUMENTS

| | | |
|---|---|---|
| 62-80068 | 5/1987 | Japan . |
| 62-113959 | 5/1987 | Japan . |
| 1455935 | 11/1976 | United Kingdom ............... 192/3.21 |

Primary Examiner—Leslie A. Braun
Assistant Examiner—Richard M. Lorence
Attorney, Agent, or Firm—Armstrong, Nikaido, Marmelstein, Kubovcik & Murray

[57] ABSTRACT

A lock-up device for a torque converter, in which a piston actuated by hydraulic force and a lock-up damper are disposed between a front cover and a turbine wheel of the torque converter, a pressing force of the piston causes both friction surfaces of a friction plate of the lock-up damper to press on a friction plate of the front cover, and plural hydraulic chambers are provided by forming a pressure surface of the piston into a multiple-stage structure. A hydraulic chamber located at the most inner peripheral side is connected to a passage of hydraulic oil. The plural hydraulic chambers are connected with each other through fine clearances. A pressure area of the piston in the most inner peripheral side hydraulic chamber is set to a size which does not permit the piston to press on the front cover side friction plate under a state where the hydraulic oil is filled only in the most inner hydraulic chamber.

8 Claims, 10 Drawing Sheets

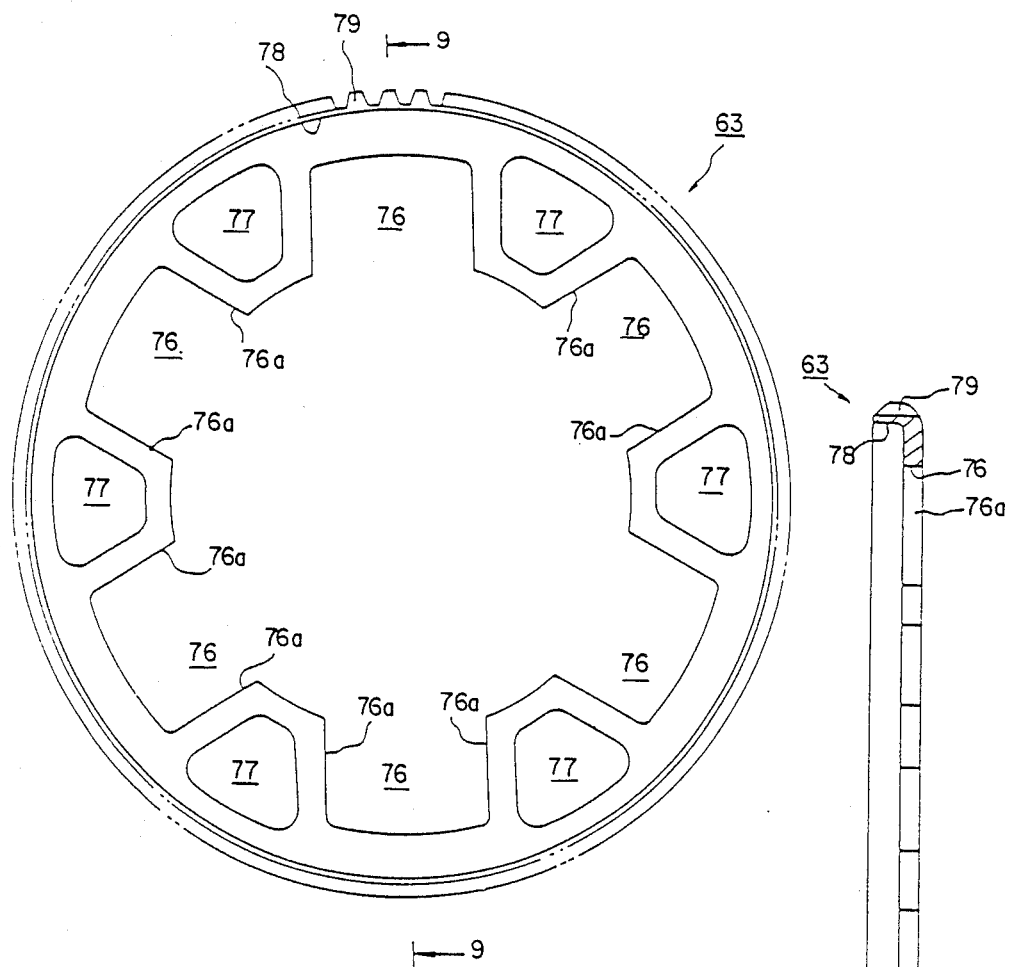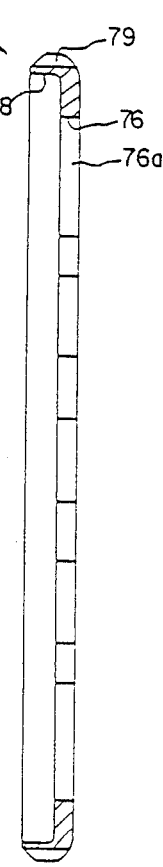
FIG. 8
FIG. 9

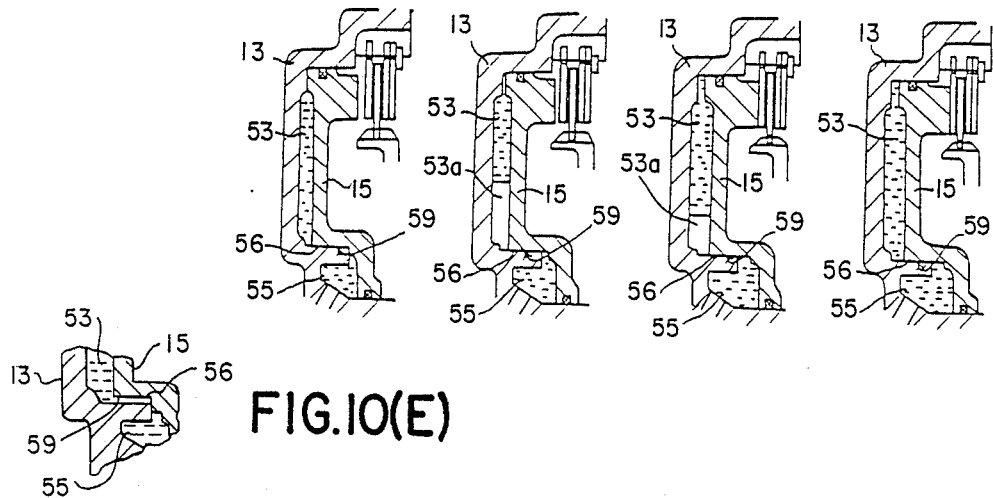
FIG. 10(A) FIG. 10(B) FIG. 10(C) FIG. 10(D)
FIG. 10(E)
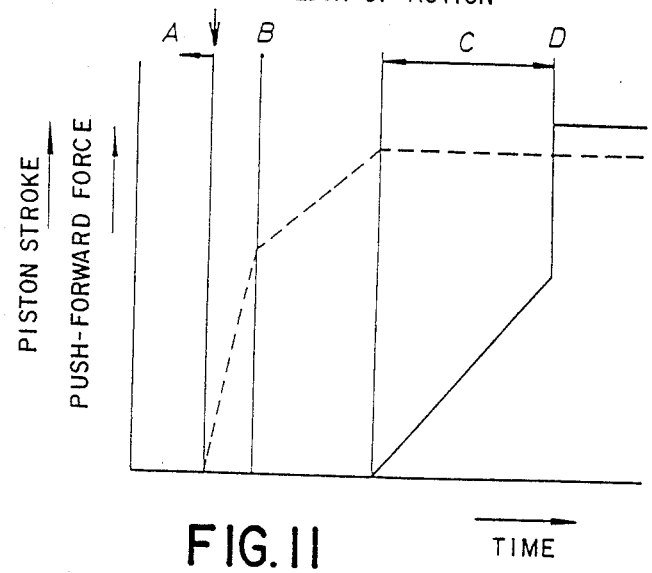
FIG. 11

FIG. 12
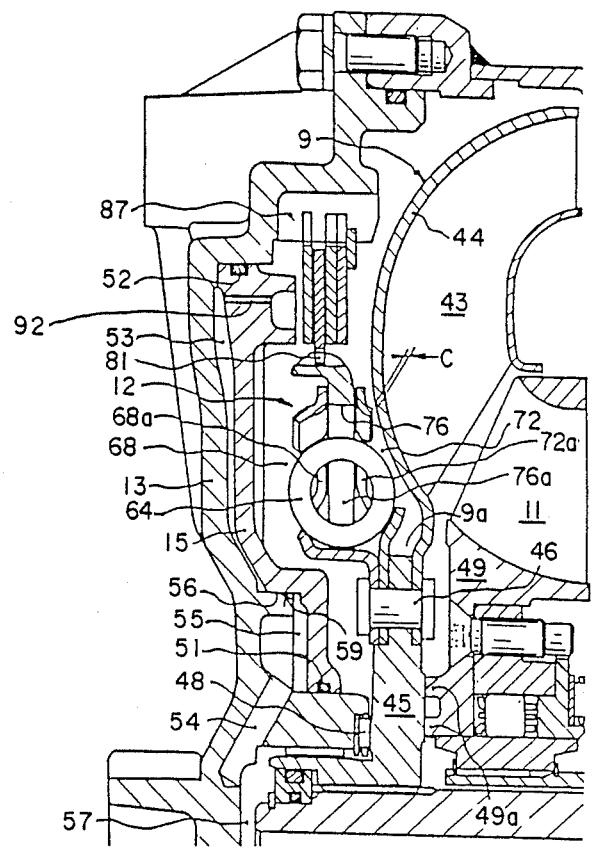
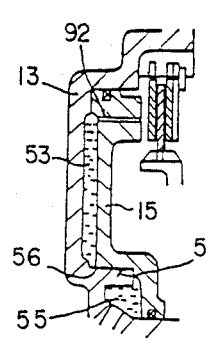
FIG.13(A)
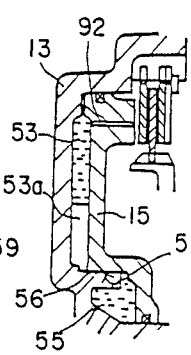
FIG.13(B)
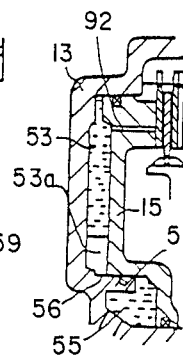
FIG.13(C)
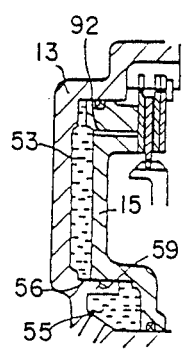
FIG.13(D)

LOCK-UP DEVICE FOR TORQUE CONVERTER

BACKGROUND OF THE INVENTION

1. Industrial Useful filed

This invention relates to a lock-up device for a so-called pressure piston type torque converter suitable for a heavy duty vehicle for use in a construction machine, in which an inside pressure of the torque converter is low and its transmission torque is large when a lock-up action is turned on.

2. Prior Art

A torque converter equipped with a lock-up device has conventionally been used for the purpose of eliminating a slippage of fluid to improve fuel consumption and prevent an engine torque from decreasing in a coupling zone of the torque converter.

With advance in automatic transmissions, the engagement rate of the lock-up device increased and the requirements for better fuel consumption increased, so that use of lock-up devices becomes necessary even in a torque converter zone wherein engine torque is multiplied. The lock-up device is used in all the speed change stages so that an application frequency of the lock-up device may increase by a large margin. Further, the above lock-up action can be easily controlled by electronic means. In case, for example, when speed is changed from one lock-up state to another state, it is sometimes required to temporarily release the lock-up state at the time of speed change. The lock-up action is executed even when a difference of rotation speeds is large between the engine and a turbine forming an output of the torque converter, so that the work volume of friction material of the lock-up device increases and need for heavy duty operation rises. Moreover, shock torque will seldomly be generated in the lock-up action when the rotation speed difference between engine and turbine is small, but will be more readily generated when the difference is large.

In conventional lock-up devices; one system has been employed for passenger cars, wherein a friction material bonded to a piston installed at a turbine side is pressed on a front cover, and another system has been employed for heavy duty industrial construction machines, wherein a piston installed at the front cover side pinches a disc installed at the turbine side.

In the lock-up device for heavy duty application, however, a pressure surface of the piston is formed into a single-stage shape so that shock will be generated when pressure oil is supplied thereto unless such shock is counteracted. In order to eliminate this shock, a booster consisting of a control valve and an accumulator must be installed and the entire mechanism will inevitably become complicated in both mechanical and electrical aspects and increase manufacturing cost.

SUMMARY OF THE INVENTION

OBJECT OF THE INVENTION

An object of this invention is to provide a lock-up device for a torque converter, which enables smooth engagement and disengagement operations without generating a shock when the lock-up action is turned on and off.

Another object of the invention is to provide a lock-up device for a torque converter, which enables a compact layout and avoids increase in size because of multiplied stage pistons.

A further object of the invention is to provide a lock-up device for a torque converter, which induces no cost increase even when a piston is formed into a multiple-stage shape and which can accomplish decrease in manufacturing cost, as compared with a device where a separate booster consisting of a control valve and an accumulator is installed to eliminate shock.

A still further object of the invention is to provide a lock-up device for a torque converter, which enables smooth engaging and disengaging operations, without generating shock, when turning on and off in the lock-up action and can shorten engaging and disengaging times, so that such trouble can be corrected by stepping on the acceleration pedal and causing the engine to race and lock-up action effected and cause engine speed to decrease, when such a control is executed under a coasting state, the lock-up action is turned off to decrease engine speed and lock-up actuation is effected when the acceleration pedal is stepped on.

STRUCTURE OF THE INVENTION

In order to accomplish the foregoing objects, in a lock-up device for torque converter wherein a piston actuated by hydraulic force and a lock-up damper are disposed between a front cover of the torque converter and the turbine wheel, and a pressing force from the piston causes both friction surfaces of a friction plate of the lock-up damper to press on a friction plate at the front cover side. Plural hydraulic chambers are provided by forming a pressure surface of the piston into a multiple-stage, a hydraulic chamber positioned at the most inner peripheral side of such hydraulic chambers is connected to a supply oil passage. The plural hydraulic chambers are connected with each other through fine clearances between the piston and, steps of the pressure surface disposed in the vicinity of a fitting part of crank shaft to the torque converter in such a manner that they project toward a constricted part of an inner periphery of the turbine wheel. A pressure surface area of the piston in the hydraulic chamber located at the most inner peripheral side of such chamber is set to a value that the piston does not press on the friction plate of the front cover side when the supply oil is filled only in the inner most hydraulic chamber.

BRIEF DESCRIPTION OF THE DRAWINGS

FIG. 8 is a front view of a support disc of FIG. 3.

FIG. 9 is a sectional view taken on a line 9—9 of FIG. 8.

FIGS. 10A, 10B, 10C and 10D are explanatory sectional views of the piston of FIG. 3 showing the piston at various stages of operation.

FIG. 10E is a view of the circled portion of FIG. 10A showing the clearance enlarged.

FIG. 11 is a explanatory diagram of a piston stroke and pressing load of FIG. 3.

FIG. 12 is a sectional view of essential parts of a lock-up device for torque converter of another embodiment.

FIGS. 13A, 13B, 13C and 13D are explanatory sectional views of the piston of FIG. 12 showing the piston at various stages of operation.

DETAILED DESCRIPTION OF THE INVENTION

Embodiment 1

Figure 1:
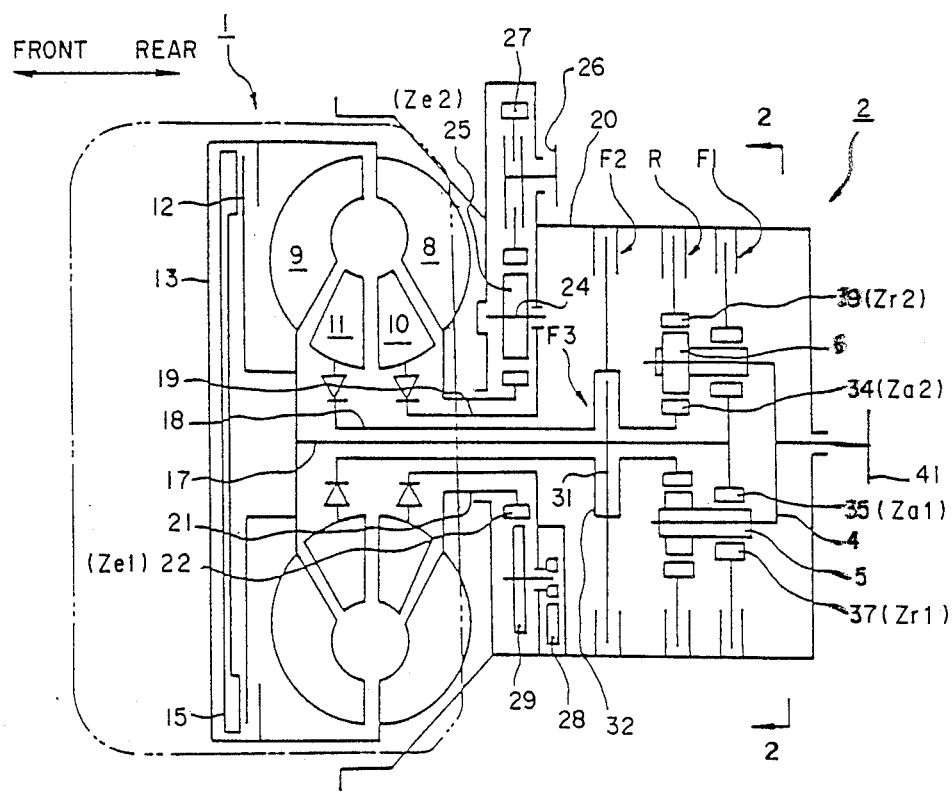
FIG. 1 is a schematic structural diagram of an automatic transmission for a heavy duty vehicle such as a construction machine employing the torque converter according to the present invention.

As illustrated in FIG. 1, a transmission 2 with three forward speeds and one backup speed is coupled to a rear side of a four-element two-stage torque converter 1. The transmission 2 has a planetary gear train consisting of a first planetary gear 5 and a second planetary gear 6, which share, in common, one planetary carrier 4 and has brakes F1, F2 and R or a clutch F3 which control the planetary gear train.

The automatic transmission is composed of the transmission 2, the torque converter 1 and a hydraulic speed change stage control unit which will be described later herein.

The torque converter 1 consists of pump 8, a turbine 9, a fixed stator 10, a reversing stator 11 and a lock-up damper or lock-up clutch 12. Engine power is transmitted from the front cover 13 to the pump 8.

A piston 15 is installed freely slidingly between the lock-up damper 12 and the front cover 13, and provides a so-called pressure piston type torque converter wherein both surfaces of the lock-up damper 12 form torque transmitting surfaces when the piston 15 is activated by hydraulic force toward lock-up damper 12.

The turbine 9 is coupled to a turbine shaft 17 and the reversing stator 11 is coupled to a stator shaft 18. The fixed stator 10 is fixed by a shaft 19 to a housing 20, and the pump 8 is connected to a pump shaft 21. A ring gear 22 is provided at a transmission side end of the pump shaft 21, and the tooth number of the ring gear 22 is set to $Ze1$.

The ring gear 22 meshes with a gear 25 (tooth number: $Ze2$) of an intermediate gear 24 disposed at an upper part of the housing 20. Gear 25 meshes further with gear 27 of a PTO (Power Take Off) shaft 26. A charging pump 28 which is the hydraulic source is provided at a lower part of the housing 20, and activated by a sliding gear 29 meshing with ring gear 22.

A clutch disc 31 of a clutch F3 for third speed is fixed to a midway of the turbine shaft 17. A clutch cover 32 of the clutch F3 is connected to the stator shaft 18. A brake F2 for second speed is disposed at an outside of the clutch cover 32, and the brake F2 is fixed to the housing 20.

A second sun gear 34 (tooth number: $Za2$) is fixed to an end portion of the stator shaft 18, and a first sun gear 35 (tooth number: $Za1$) is fixed to an end portion of the turbine shaft 17. The first sun gear 35 meshes with the first planetary gear 5, and the second sun gear 34 meshes with the second planetary gear 6.

A first ring gear 37 (tooth number: $Zr1$) is provided at an outside of the first planetary gear 5, and the first ring gear 37 meshes with the first planetary gear 5. A brake F1 for first speed fixed to the housing 20 is disposed at a further outside of the first ring gear 37.

A second ring gear 39 (tooth number: $Zr2$) meshes with the second planetary gear 6 at its outside, and a brake R1 for backward drive is disposed at a further outside of the second ring gear 39.

Figure 2:
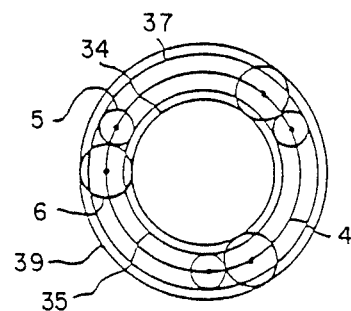
FIG. 2 is a sectional view taken on a line 2—2 of FIG. 1.

The first planetary gear 5 and the second planetary gear 6 are carried on the planetary carrier 4 in such a manner that they can freely mesh with each other as illustrated by FIG. 2.

An output shaft 41 is connected to the planetary carrier 4.

The foregoing transmission 2 is able to produce reduction ratios as listed in the following Table by selectively engaging the clutch F3 and the brakes F1, F2 and R1. The O marks in the Table indicate engaged states of the clutch F3 and the brakes F1, F2 and R1. t,0110

| Shifting position | | F1 | F2 | F3 | R | Reduction ratio |
|---|---|---|---|---|---|---|
| Forward drive | 1st speed | O | | | | $\frac{Za1 + Zr1}{Za1} > 2$ |
| | 2nd speed | | O | | | $2 > \frac{Za1 + Za2}{Za1} > 1$ |
| | 3rd speed | | | O | | 1 |
| Backward drive | | | | | O | $-\frac{Zr2 + Za1}{Za1}$ |

Figure 3:
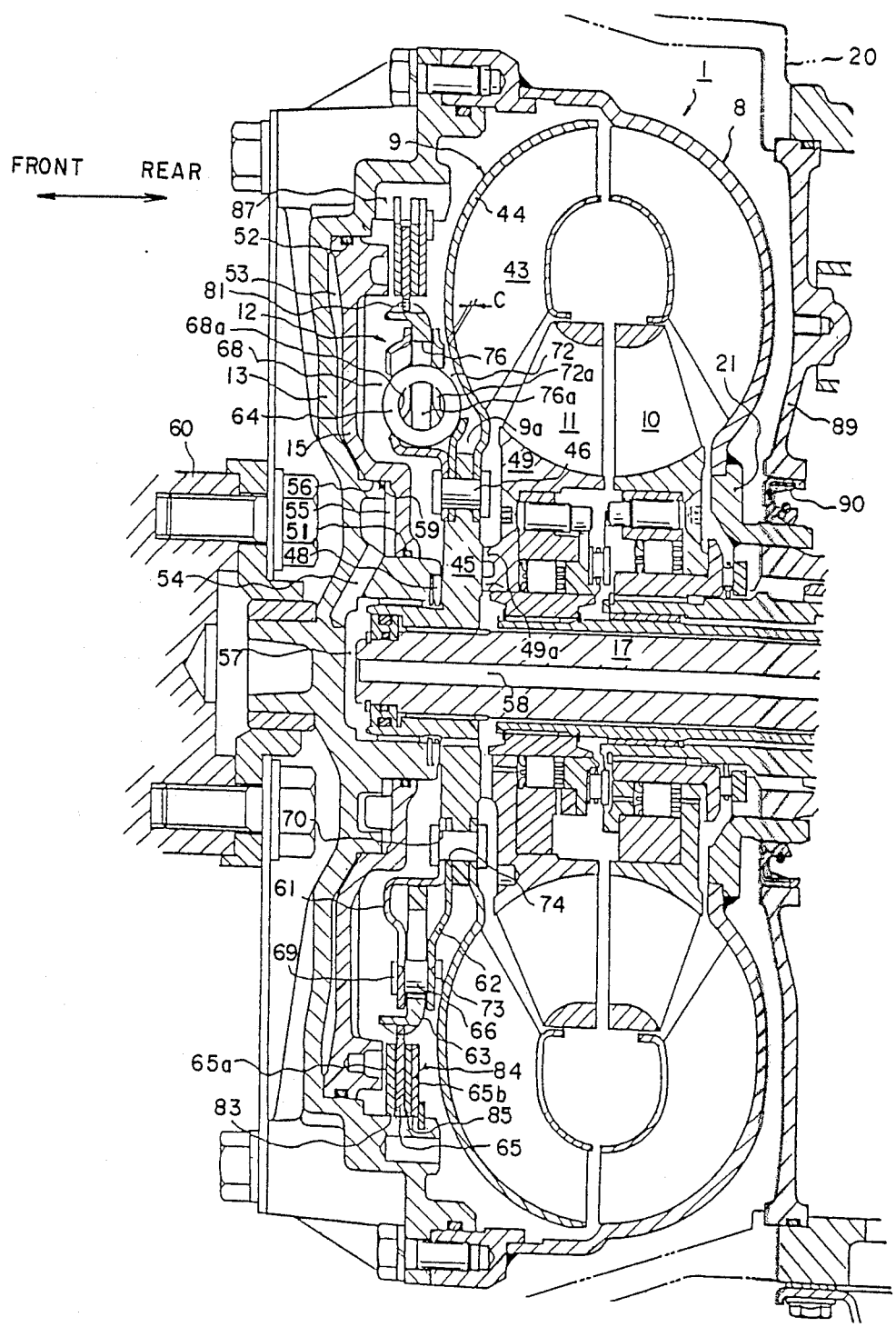
FIG. 3 is a sectional view of the lock-up device of the torque converter of FIG. 1.

Details of the lock-up damper 12 disposed between the fron cover 13 and the turbine (turbine wheel 9) will be described hereunder with reference to FIG. 3. FIG. 3 shows that portion of FIG. 1 surrounded by a two-dot chain line.

The turbine 9 is composed of a turbine blade 43, a turbine shell 44, and a hub 45. An inner peripheral part of the turbine shell 44 is fastened by rivets 46, to an outer peripheral backside face of the hub 45. The lock-up damper 12, which will be described later in details, is fastened by the rivets 46 to an outer peripheral frontside face of the hub 45 and the turbine shell 44.

An inner peripheral part of the hub 45 spline fits onto a front end portion of the turbine shaft 17. The hub 45 is held by a thrust bearing 48 and an inner peripheral front edge 49a of a hub 49 of the reversing stator 11 in such a manner that the hub 45 can not move in its axial direction.

The approximately annular piston 15 fits in the front cover 13, through O-rings 51 and 52, so as to slide freely in its axial direction while keeping fluid-tightness. An annular hydraulic chamber 53 is formed in between the front cover 13 and the piston 15. A passage 54 is drilled at a central part of the front cover 13. The upper end of the passage 54 connects through an annular hydraulic chamber 55 and a fine clearance 56 between front cover 13 and piston 15 to hydraulic chamber 53. Further, the lower end of the passage 54 connects through a space 57 to a passage 58 of the turbine shaft 17. The fine clearance 56 serving as an orifice mechanism connecting hydraulic chambers 53 and 55 and is formed by a stepped part 59. Stepped part 59 is formed at a position in the vicinity of where the torque converter 1 is attached to a crank shaft 60 in such a manner that the stepped part 59 projects toward a constricted portion 9a of an inner peripheral part of the turbine 9. As described above, the piston 15 is formed into a two-stage piston.

The lock-up damper 12 is disposed between the piston 15 and the turbine shell 44. The lock-up damper 12 is composed of a first retaining plate 61, a second retaining plate 62, a support disc 63, a torsion spring 64, a driven plate 65 and a stop pin 66.

Figure 4:
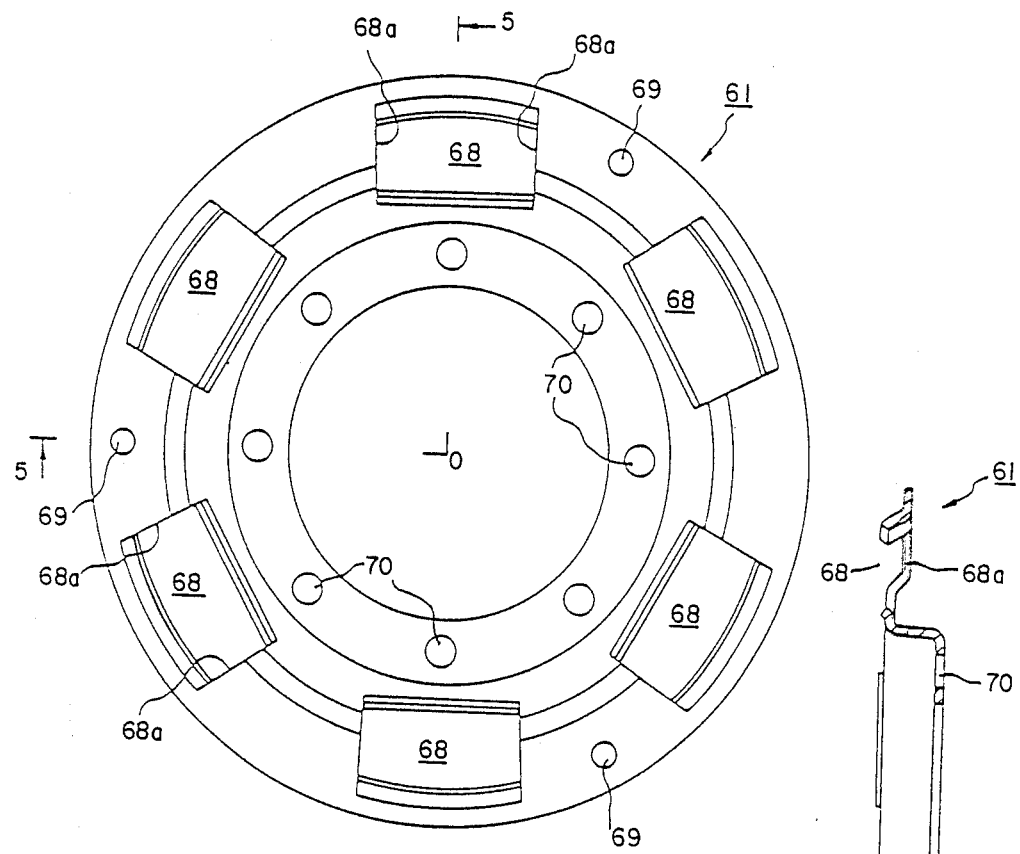
FIG. 4 is a rear view of a first retaining plate of FIG. 3.

The first retaining plate 61 is formed into an approximately disc-like shape, as illustrated in FIG. 4, with holes 68, for incorporating the torsion springs 64 (FIG. 3) on the first retaining plate 61 at six places in a circumferential direction with equal spaces left therebetween. Further, bores 69, through which the stop pins 66 (FIG. 3) pass, are made at three places in circumferential direction between the holes 68 with equal spaces left therebetween. Moreover, eight bores 70 through which the rivets 46 (FIG. 3) pass are made in the circumferential direction on an inner peripheral part of the first retaining plate 61 with equal spaces left therebetween.

Figure 5:
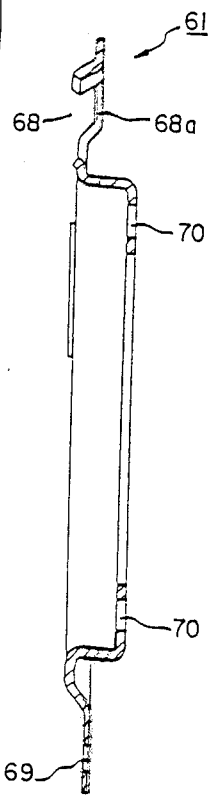
FIG. 5 is a sectional view taken on a line 5—5 of FIG. 4.

In the first retaining plate 61, as illustrated by FIG. 5, outer peripheral parts, at which the holes 68 are made, are bent into approximately L-shape toward a left side of FIG. 5 (front side of FIG. 3).

Figure 6:
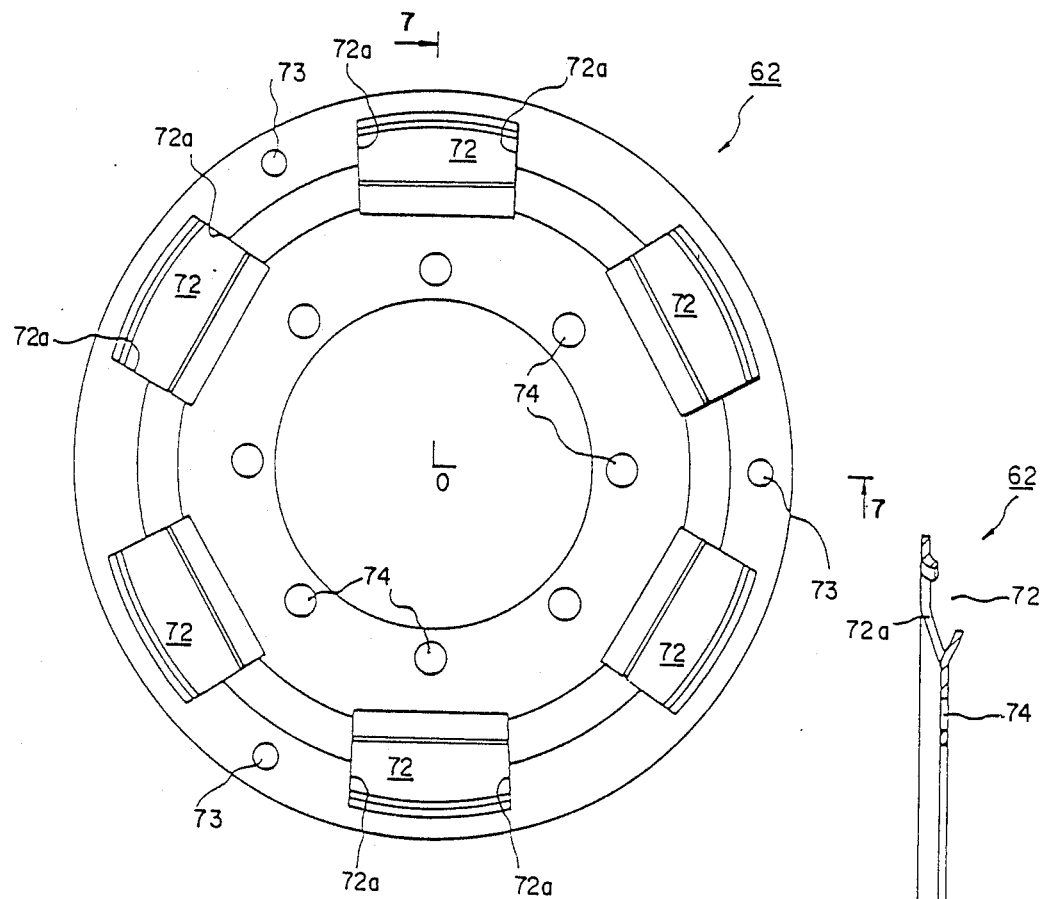
FIG. 6 is a front view of a second retaining plate of FIG. 3.

The second retaining plate 62 is also formed into an approximately disc-like shape as illustrated by FIG. 6. Six holes 72, three bores 73 and eight bores 74 are made thereon in the circumferential direction with equal spaces left therebetween in the same manner as the first retaining plate 61.

Figure 7:
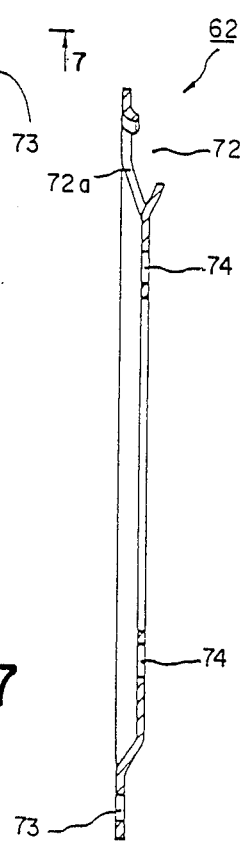
FIG. 7 is a sectional view taken on a line 7—7 of FIG. 6.

In the second retaining plate 62 as illustrated by FIG. 7, outer peripheral parts, at which the holes 72 are made, are so formed as to be slightly inclined toward the left side of FIG. 7.

In a state where inner peripheral parts of the both retaining plates 61 and 62 are mated together, as illustrated in FIG. 3, the rivets 46 pierce the bores 70 and 74 and tighten them to a front face of the hub 45. In this state, a rear face of the second retaining plate 62, facing on the turbine shell 44, extends outwardly in a radial direction along a front face of the turbine shell 44. Clearance C1 between the turbine shell 44 and the second retaining plate 62 is set to an extremely small value and can be eliminated.

If the dimension (thickness of crimping part) of the stop pin 66 is adjusted so that the second retaining plate 62 merely contacts the turbine shell 44.

The support disc 63, which will be described later in details, is held between the retaining plates 61 and 62. Under a condition where outer peripheries of retaining plates 61 and 62 are fastened by the rivets 66, this support disc can slide in its circumferential direction relatively to retaining plates 61 and 62 within a specified angular range.

A notch for incorporating the torsion spring 64 is formed on an inner peripheral part of the support disc 63. Both ends of the torsion spring 64 press on circumferential end faces 76a of the notch 76. Further, the ends of the torsion spring 44 press on circumferential end faces of the holes 68 and 72 of retaining plates 61 and 62. The spring force of the torsion spring 64 urges retaining plates 61 and 62 and the support disc 63 to respective initial state positions.

The support disc 63 is formed as illustrated by FIG. 8 and FIG. 9, and the notch 76 opens toward an inside. Holes 77 for, having the, stop pins 66 (FIG. 3) pass through in a free condition, i.e. freely rotatably in the circumferential direction, are formed at six places on the notch 76.

A peripheral wall 78, bending in an approximately L-shape toward left side of FIG. 9, is formed on an outer periphery of the support disc 63. An external spline tooth 79 is formed on an outer periphery of the peripheral wall 78.

As illustrated in FIG. 3, an internal spline tooth 81 of the annular disc-like driven plate 65 fits onto the external spline tooth 79. A front cover side driven plate 83 and an end plate 84 face on friction surfaces 65a and 65b of the driven plate 65. The drive plate 83 and the end plate 84 are formed into annular disc-like shapes end plate 84 is composed of two parallelly installed plates 85 similar to the drive plate 83. The drive plate 83 and the two plates 85 composing the end plate 84 fit in an internal spline tooth 87 of the front cover 13. Accordingly, when the piston 15 is moved by the hydraulic force toward the backside, the drive plate 83 is pressed on the end plate 84 through the driven plate 65, and the both friction surfaces 65a and 65b of the driven plate 65 press on the drive plate 83 and the end plate 84 so as to form torque transmitting surfaces at the time of lock-up action.

The pump 8 of the torque converter 1 is carried by the pump shaft 21. An oil seal 90 is interposed between partition wall 89 of the housing 20 and the pump shaft 21. A detailed structure of the pump shaft 21 and a working oil passage from the charging pump 28 (FIG. 1) through the torque converter 1 inside to the passage 58 are disclosed, in details, in Japanese Patent (KOKAI) No. 62-80068.

FUNCTION OF THE INVENTION

Function will be described hereunder.

In the lock-up state, where the front cover 13 of the torque converter 1 is coupled to the turbine shaft 17 by the lock-up damper 12, the hydraulic oil supplied from the passage 58, through the space 57, and the passage 54 to the hydraulic chamber 55, and the changing states as illustrated in FIG. 10 (A) to FIG. 10(B).

FIG. 10(A) shows a state where hydraulic pressure has not been applied to the hydraulic oil in the hydraulic chamber 55. In this state, the torque converter 1 is filled with oil and rotates continually so that the pressurized in the torque converter pushes the piston 15 toward the front cover 13. However, because hydraulic chamber 53 is also filled with oil, a centrifugal force is applied to the oil in chamber 53 so that the oil pressure in chamber 53 urges the piston 15 toward the turbine 9. Consequently, a position of the piston 15 is balanced in terms of the centrifugal force generated by rotation. An oil pressure in the torque converter 1 is normally kept at a low pressure of 1~2 kg/cm² in order to eliminate an occurence of a cavitation of the converter inside, so that the piston 15 is pressed on the front cover 13 by this pressure for releasing the lock-up state.

FIG. 10(B) shows a state where hydraulic oil under pressure is supplied to the inner peripheral side hydraulic chamber 55. In this state, the piston 15 moves toward the turbine 9 against the holding pressure in the torque converter. The passage between the hydraulic chamber 55 and the hydraulic chamber 53 is throttled by the fine clearance 56 preventing the hydraulic oil under pressure from flowing into chamber 53. Therefore, a negative pressure portion 53a filled with no hydraulic oil is produced in the hydraulic chamber 53. The piston 15 is pulled toward the front cover 13 by a negative pressure of the negative pressure portion 53a to be balanced just at a position of FIG. 10(B). Under this state, the outer peripheral portion of piston 15 does not engage the drive plate 83. This condition can be easily realized by the following procedures. A volume of the negative pressure portion 53a is calculated, which is produced when the piston moves from the state of FIG. 10(A) to its stroke end; and a pull-back force toward the front cover 13 caused by the negative pressure portion 53a is set larger than a push-forward force toward the hydraulic chamber 55 caused by the hydraulic oil. Namely, with a condition that the pressure of hydraulic oil supplied to the hydraulic chamber 55 is constant, the above condition can be obtained by setting appropriately a ratio of a pressure area of the piston 15 in the hydraulic chamber 55 to that in the hydraulic chamber 53.

With the lapse of time, the hydraulic oil supplied to the hydraulic chamber 55 passes through the clearance at 56 to the hydraulic chamber 53 to increase the volume of oil in the hydraulic chamber 53. The oil pressure in the hydraulic chamber 53 is increased by the centrifugal force to cause a decrease in the negative pressure of the negative pressure portion 53a, and the outer peripheral portion of piston 15 contacts with the drive plate 83 as shown by FIG. 10(C). The oil pressure generated by the centrifugal force in the hydraulic chamber 53 is further increased to cause a gradual increase in the push-forward force on the piston 15. During this process, an engagement of the lock-up action is commenced and the transmission of torque is effected so that no engaging shock will arise.

When the hydraulic chamber 53 is filled with the hydraulic oil as illustrated by FIG. 10(D), the inside pressure increases due to the pressure working on the hydraulic chamber 55, in addition to the centrifugal force. Thus the push-forward force on the piston 15 increases abruptly. In this instance, however, a difference in rotation speeds of the engine and the turbine 9 is small or almost zero so that no shock torque will be produced.

Changes of the stroke of the piston 15 and the push-forward force in the above course are shown in FIG. 11. In FIG. 11, the broken line indicates the piston stroke and the solid line indicates the push-forward force.

As seen from the above description, when the pressure of hydraulic oil flowing in the hydraulic chambers 53 and 55 works on a large pressure surface of the piston 15 to move the piston 15 backward, the piston 15 pushes the drive plate 83 on the driven plate 65. Thereby, the driven plate 65 is pressed on the end plate 84 so that the driven plate 65 of the lock-up damper 12 is held and pressed in between the front cover side drive plate 83 and the end plate 84 by means of the hydraulic force exerted from the piston 15.

In this instance, a torque transmitted from the drive plate 83 and end plate 84 to the driven plate 65 can be transmitted through wide areas of the both friction surfaces 65a and 65b so that it becomes possible to transmit a large torque even in case of the torque converter 1 for construction machine which is operated frequently at a low engine speed and on a comparatively low hydraulic pressure in the hydraulic chamber 53.

As described above, when the torque is transmitted from the front cover 13 to the lock-up damper 12, the support disc 63 slides relatively to the both retaining plates 61 and 62 against the spring force of the torsion spring 64 in the circumferential direction. However, since the both retaining plates 61 and 62 are fastened by the rivet 46 to the hub 45, the turbine 9 rotates integrally with the both retaining plates 61 and 62.

When the lock-up action is released, the hydraulic oil in the hydraulic chamber 53 is discharged through the passages 54 and 58, and the piston 15 returns to the front side.

The piston 15 is designed into the two-stage structure in the above manner, so that engaging and disengaging operations can be carried out smoothly without generating shock. Two-stage pistons have been used in a conventional ordinary hydraulic clutch. In such ordinary hydraulic clutch however, the structure has been such that, at the time of engaging the clutch, the piston first pushes a friction material with a small force by means only of a first stage presser part, and it then pushes the friction material with a specified force when hydraulic oil is filled in a second stage. Since the piston pushing force of the first stage in such conventional hydraulic clutch has naturally been set larger than an urging force of the return spring for returning the piston, a shock has been generated even from the first-stage piston in case of different loading conditions.

In the present invention however, such a problem will not arise because the piston 15 does not contact the drive plate 83 under a condition where the hydraulic oil is filled only in the hydraulic chamber 55. Further, it is not required so much to shorten a response time for the lock-up clutch as compared with a speed-change clutch, so that the slow engagement as described in this invention will cause no trouble.

Moreover, the stepped part 59 is disposed in the vicinity of the position where the torque converter 1 is attached to the crank shaft 60 in such manner that the stepped part 59 projects toward the constricted portion 9a of the inner peripheral part of the turbine 9, so that the entire unit can be made compact.

Furthermore, because only the piston 15 is designed into the two-stage, the manufacturing cost does not increase as compared with the single-stage piston. The cost may rather be reduced than the case where the shock is eliminated by employing the booster composed of the control valve and accumulator etc.

In the foregoing embodiment, an example of the piston 15 designed into the two-stage structure is described. However, the piston 15 may be designed into a multiple-stage, i.e. a three-stage or more, structure.

In addition, when the pressure piston type control circuit as disclosed in Japanese Pat. No. 62-113959 is employed wherein the holding pressure in the torque converter at the time of lock-up action is kept at 0 kg/cm$^2$, the lock-up operation pressure can be minimized and the pressure rise effect under the state of FIG. 10(C) can be improved by enlarging the volume of the hydraulic chamber 53.

Embodiment 2

FIG. 12 shows an embodiment in which plural orifices 92 are formed on an outer peripheral part of the piston 15 with appropriate distances left therebetween in the circumferential direction.

In this embodiment, at the time of lock-up state, where the front cover 13 of the torque converter 1 and the turbine shaft 17 are coupled by the lock-up damper 12, the hydraulic oil is supplied from the passage 58 through the space 57 and the passage 54 to the hydraulic chamber 55, and the circumstances change from FIG. 13(A) to FIG. 13(B).

FIG. 13(A) shows a state where the hydraulic oil does not work in the hydraulic chamber 55, and in this state the inside of the torque converter 1 is filled with oil and rotates continually so that the oil, the torque converter is pressurized to push the piston 15 toward the front cover 13. However, because chambers 53 and 55 are also filled with oil, a centrifugal force works on the oil in the same manner so that the oil pressure in the piston 15 urges the piston 15 toward the turbine 9. Consequently, a position of the piston 15 is balanced in terms of the centrifugal force generated by the rotation. An oil pressure in the torque converter 1 is normally kept at a low pressure of 1~2 kg/cm² in order to eliminate an occurence of a cavitation of the converter inside, so that the piston 15 is pressed on the front cover 13 by this pressure to release the lock-up state.

FIG. 13(B) shows a state where hydraulic oil under pressure is supplied to the inner peripheral side hydraulic chamber 55. In this state, the piston 15 moves toward the turbine 9 against the holding pressure in the torque converter, but the supply of oil can not follow the movement of piston because the passage of such hydraulic oil under pressure between the hydraulic chamber 55 and the hydraulic chamber 53 is throttled by the fine clearance 56. Therefore, a negative pressure portion 53a filled with no hydraulic oil is produced in the hydraulic chamber 53. The piston 15 is pulled toward the front cover 13 by a negative pressure of the negative pressure portion 53a to be balanced just at a position of FIG. 10(B). Under this state, the outer peripheral portion of piston 15 does not contact with the drive plate 83.

With the lapse of time, the hydraulic oil supplied to the hydraulic chamber 55 passes to the hydraulic chamber 53 to cause an increase in an oil amount in the hydraulic chamber 53, the oil pressure in the hydraulic chamber 53 is increased by the centrifugal force to cause a decrease in the negative pressure of the negative pressure portion 53a, and the piston 15 contacts with the drive plate 83 as shown by FIG. 10(C). In this instance, the orifices 92 are provided on the outer peripheral part of the piston 15, so that the oil in the torque converter 1 flows to the hydraulic chamber 53 through the orifices 92 and a time required for a change of the state from FIG. 13(B) to FIG. 13(C) can therefore be shortened. Then, the oil pressure generated by the centrifugal force in the hydraulic chamber 53 further increases to cause a gradual increase in the push-forward force on the piston 15. In this state, the orifices 92 are blocked by the drive plate 83 so that no oil flows from the hydraulic chamber 53 through the orifices 92. During this process, an engagement of the lock-up action is commenced and the transmission of torque is completed so that no engaging shock will be produced.

When the hydraulic chamber 53 is filled with the hydraulic oil as illustrated by FIG. 13(D), the inside pressure increases due to the pressure working on the hydraulic chamber 55 in addition to the centrifugal force, thus the push-forward force on the piston 15 increases abruptly. In this instance, however, a difference in rotation speeds of the engine and the turbine 9 is small or almost zero, so that no shock torque will be produced.

When the lock-up action is released, the hydraulic oil in the hydraulic chamber 53 is discharged through the passages 54 and 58, and the piston 15 returns to the front side. Further, the hydraulic oil in the hydraulic chamber 53 is discharged also through the orifices 92 so that a time for releasing the lock-up action is also shortened.

As described above, the piston 15 is designed into the two-stage structure and the orifices 92 connecting the hydraulic chamber 53 with the inside of the torque converter 1 are disposed on the outer peripheral part of the piston 15, so that the engaging and disengaging operations for turning on and off the lock-up action can be carried out without any shock and moreover the operation time can be shortened.

Embodiment 3

Figure 14:
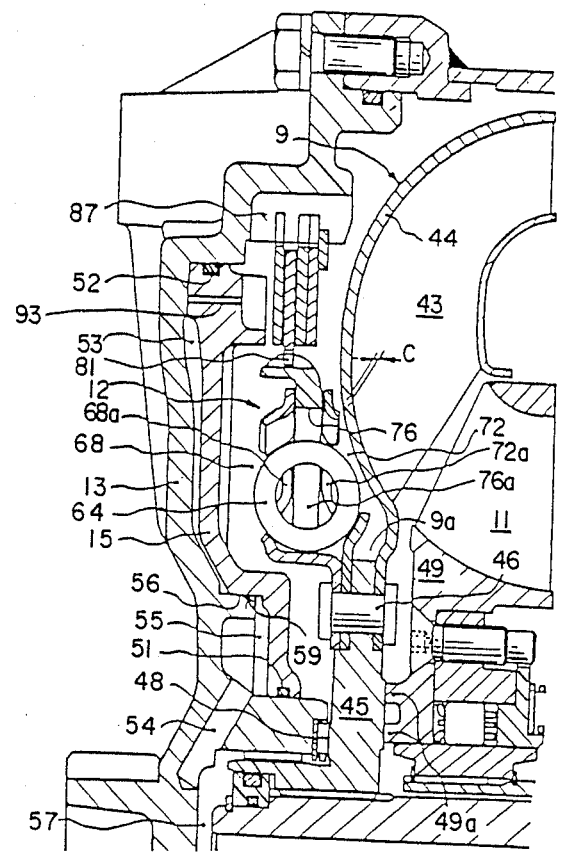
FIG. 14, FIG. 15 and FIG. 16 are sectional views of essential parts of lock-up devices for torque converters of further embodiments.

FIG. 14 shows an embodiment in which orifices 93 are blocked by the front cover 13 under a state where the outer peripheral part of the piston 15 contacts with the front cover 13. According to this structure, an ingress of the hydraulic oil from the inside of the torque converter 1 to the hydraulic chamber 53 can be prevented under the state where the lock-up action is turned off.

Embodiment 4

Figure 15:
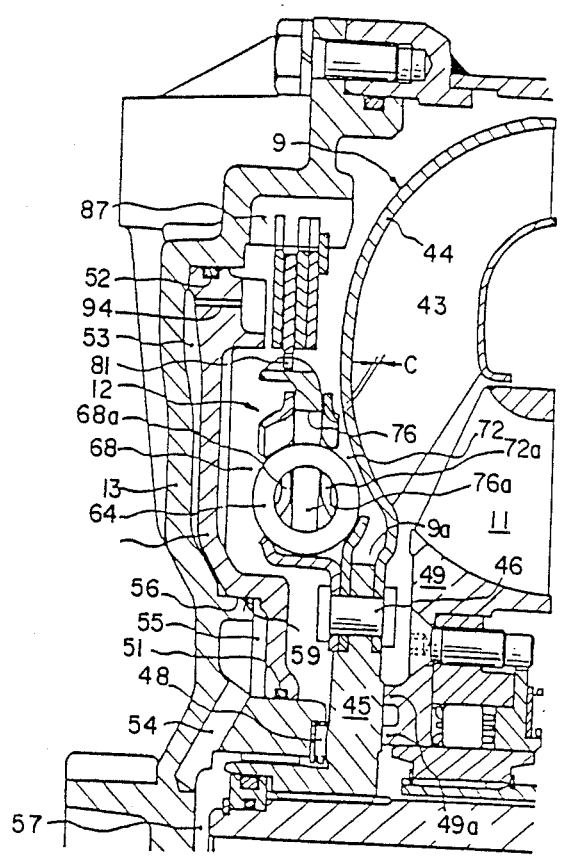

FIG. 15 shows an embodiment in which the hydraulic oil is supplied from the inside of the torque converter 1 through orifices 94 to the hydraulic chamber 53 even when the piston 15 presses on the drive plate 83. According to this structure, a time required for a change of the state from FIG. 13(C) to FIG. 13(D) can also be shortened so that the engaging and disengaging times for turning off the lock-up action can be shortened further. Moreover, when the inside of the torque converter 1 is so constructed as to connect to a drain as disclosed in Japanese Pat. No. 62-113959, the inside of the torque converter 1 can be supplemented with oil so that this structure can serve a lubricating function.

Embodiment 5

Figure 16:
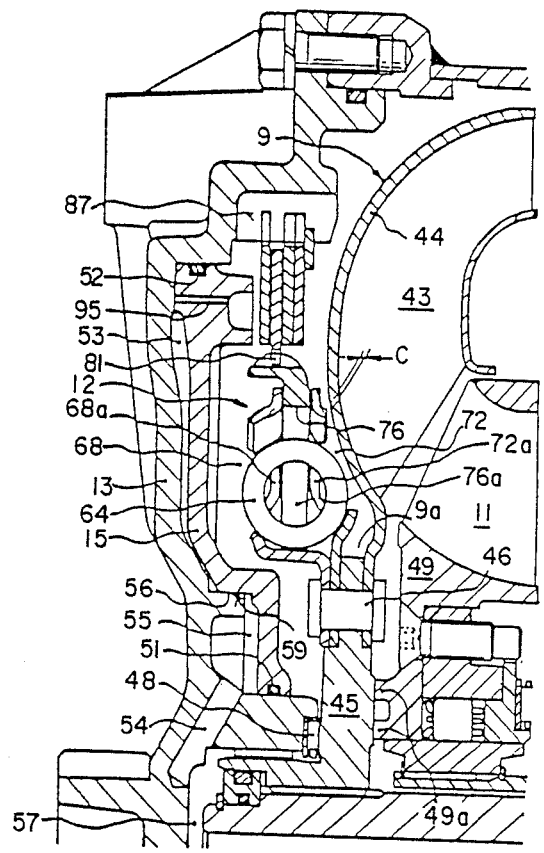

FIG. 16 shows an embodiment, in which orifices 95 are blocked by the front cover 13 under a state where the outer peripheral part of the piston 15 contacts with the front cover 13, and further the hydraulic oil is supplied from the inside of the torque converter 1 through the orifices 95 to the hydraulic chamber 53 until the piston 15 presses on the drive plate 83. According to this structure, an ingress of the hydraulic oil from the inside of the torque converter 1 to the hydraulic chamber 53 can be prevented under the state where the lock-up action is turned off, and a time required for the change of the state from FIG. 13(C) to FIG. 13(D) can also be shortened so that the engaging and disengaging times for turning off the lock-up action can be shortened further. Moreover, when the inside of the torque converter 1 is so constructed as to connect to a drain, the inside of the torque converter 1 can be supplemented with oil so that this structure can serve the lubricating function.

EFFECT OF THE INVENTION

According to the invention as described above, the shock can be eliminated at the time when turning off the lock-up action and the engaging and disengaging operations can be carried out smoothly. Further, the stepped part of the pressure surface is disposed in the vicinity of the position where the torque converter is attached to the crank shaft in such the manner that the stepped part projects toward the constricted portion of the inner peripheral part of the turbine. Accordingly, the entire layout can be made compact and an increase in sizes of unit due to the use of the multiple-stage piston can be avoided. Moreover, this structure induces no cost increase even when the piston is formed into the multiple-stage structure and the cost-down can be accomplished as compared with the case where the separate booster consisting of the control valve and accumulator etc. is installed in order to eliminate the shock. Furthermore, the structure according to the invention enables the smooth engaging and disengaging operations without generating the shock when turning on and off the lock-up action and can shorten the engaging and disengaging times, so that such the trouble can be corrected that stepping on the acceleration pedal causes the engine to race once and the lock-up action is then effected to cause the engine speed to decrease, in case where such the control is executed under the coasting state that the lock-up action is turned off to decrease the engine speed and the lock-up action is effected when the acceleration pedal is stepped on.

What is claimed is:

1. A lock-up device for a torque converter wherein a piston activated by hydraulic pressure and a lock-up damper having a friction plate with friction surfaces thereon for engagement with a friction plate attached to the front cover of the torque converter are disposed between said front cover and a turbine wheel of the torque converter, and a pressing force of said piston causes said friction surfaces on said friction plate on said lock-up damper to engage with said friction plate attached to said front cover; characterized by that plural hydraulic chambers are provided by forming a pressure surface at the front cover side of said piston into a multiple-stage structure, a hydraulic chamber located at the inner peripheral side of said piston at said front cover side among said hydraulic chambers is connected to a passage for supplying hydraulic oil under pressure to said most inner hydraulic chamber, said plural hydraulic chambers are connected to each other through a fine clearance between said piston and said cover, said fine clearance between said piston and said cover forming an orifice between said inner hydraulic chamber and the remainder of said plural hydraulic chambers, said orifice decreasing in length as said piston is moved away from said cover by said hydraulic oil supplied to said most inner hydraulic chamber, said pressure surface at said front cover side of said piston having stepped parts disposed in the vicinity of a position where the torque converter is attached to a crank shaft in such manner that the stepped parts project toward a constricted portion of an inner peripheral part of the turbine wheel of said torque converter, and a pressure area of said piston in the most inner peripheral side hydraulic chamber is set to a size which does not permit said piston to engage said friction plate on said front cover when said hydraulic oil supplied under pressure fills only said inner hydraulic chamber.

2. A lock-up device for a torque converter as set forth in claim 1, in which said piston is provided with piston orifices which connect an inside of said torque converter with said plural hydraulic chambers with said fine clearance between said plural hydraulic chambers.

3. A lock-up device for a torque converter as set forth in claim 2, in which said piston orifices are provided in said piston adjacent the outer periphery of said piston and connect the inside of said torque converter with a hydraulic chamber of said hydraulic chambers other than said hydraulic chamber located at the most inner peripheral side when said piston does not press on the front cover side friction plate.

4. A lock-up device for a torque converter as set forth in claim 2, in which said piston orifices connect the inside of the torque converter with said hydraulic chamber of said hydraulic chambers other than said hydraulic chamber located at the most inner peripheral side when an outer peripheral part of said piston is situated apart from said front cover and at the same time said piston is not pressing on the front cover side friction plate.

5. A lock-up device for a torque converter as set forth in claim 2, in which said piston orifices connect said inside of said torque converter with said hydraulic chamber of said hydraulic chambers other than said hydraulic chamber located at the most inner peripheral side independently of the position of said piston.

6. A lock-up device for a torque converter as set forth in claim 2, in which said piston orifices connect said inside of said torque converter with said hydraulic chamber of said hydraulic chambers other than said hydraulic chamber located at the most inner peripheral side when an outer peripheral part of said piston is situated apart from said front cover.

7. A lock-up device for a torque converter as set forth in any one of claims 1 through 6, in which said piston is formed into approximately annular shape and forms plural hydraulic chambers between said piston and said front cover.

8. A lock-up device for a torque converter as set forth in claim 7, in which the pressure surface of said piston is formed into a two-stage structure and said piston forms two hydraulic chambers between said piston and said front cover.

* * * * *

UNITED STATES PATENT AND TRADEMARK OFFICE
CERTIFICATE OF CORRECTION

PATENT NO. : 4,924,978

DATED : May 15, 1990

INVENTOR(S) : Masahiro OHKUBO

It is certified that error appears in the above-identified patent and that said Letters Patent is hereby corrected as shown below:

On the cover page, Item [73], "Daiken" should read --Daikin--.

Signed and Sealed this

Tenth Day of September, 1991

Attest:

HARRY F. MANBECK, JR.

*Attesting Officer*  *Commissioner of Patents and Trademarks*